United States Patent [19]

Craig

[11] 4,448,057
[45] May 15, 1984

[54] APPARATUS AND METHOD FOR TESTING A GEOPHONE DURING ASSEMBLY

[75] Inventor: Gary J. Craig, Houston, Tex.
[73] Assignee: Geosource Inc., Houston, Tex.
[21] Appl. No.: 380,840
[22] Filed: May 21, 1982
[51] Int. Cl.³ .................... G01V 13/00; G01M 19/00
[52] U.S. Cl. ..................................... 73/1 DV; 367/13
[58] Field of Search .................... 73/1 DV, 652, 654; 367/13

[56] References Cited

U.S. PATENT DOCUMENTS

| | | | |
|---|---|---|---|
| 2,882,520 | 4/1959 | Hass | 73/293 |
| 2,971,364 | 2/1961 | Gatcombe | 73/1 DV |
| 3,693,400 | 9/1972 | Savit | 73/1 DV |
| 3,858,169 | 12/1974 | Bardeen | 73/1 DV X |
| 3,930,216 | 12/1975 | Hall, Jr. | 73/1 DV X |
| 4,015,202 | 3/1977 | Fredriksson et al. | 73/1 DV X |
| 4,296,483 | 10/1981 | Haill | 367/13 |

OTHER PUBLICATIONS

"An Electromechanical Transducer System for the Transient Testing of Seismographs"; 1-1953; Honnell; *Geophysics*, vol. 28, Issue-1, pp. 160-168.

*Primary Examiner*—Gerald Goldberg
*Assistant Examiner*—Tom Noland
*Attorney, Agent, or Firm*—Arnold, White & Durkee

[57] ABSTRACT

An apparatus and method for testing a geophone during assembly is disclosed. The apparatus includes a light source cooperating with a photocell for generating a voltage signal in response to light. A member for support of the geophone to be tested is located in a defined path between the light source and the photocell for generating a voltage signal. The apparatus further includes a display unit for indicating the voltage signal generated, which is representative of the resilient characteristics of the geophone springs, characterizing the position of the geophone coil and its resonant frequency.

25 Claims, 8 Drawing Figures

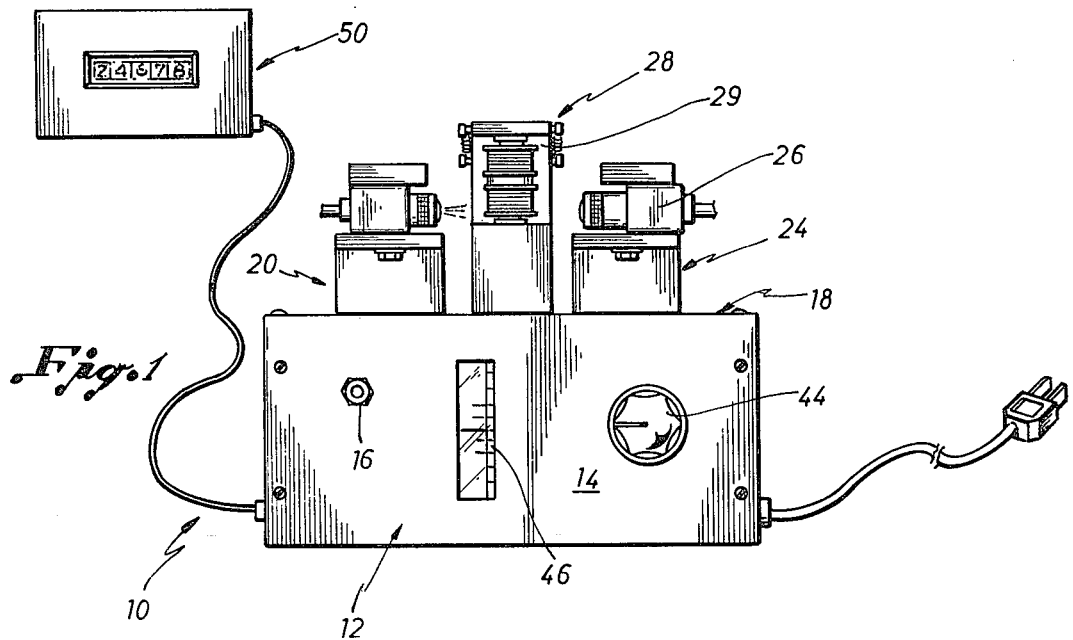
Fig. 1
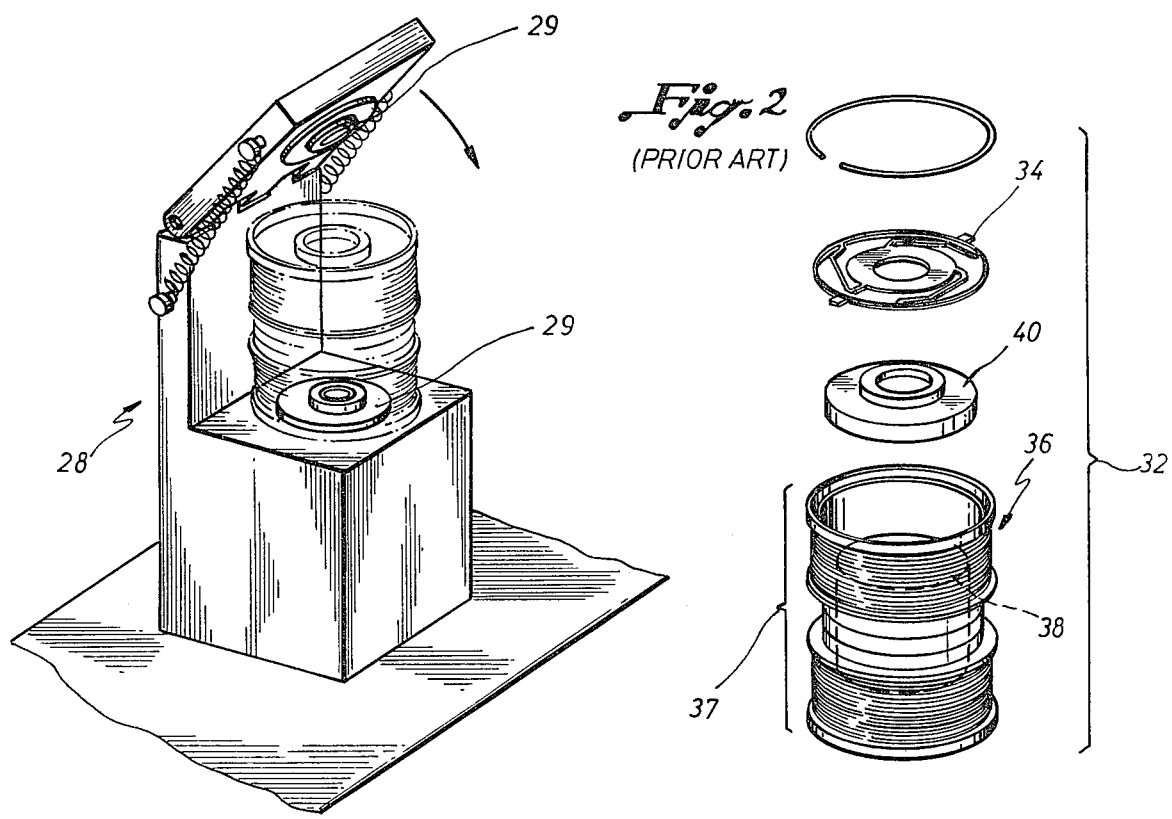
Fig. 2 (PRIOR ART)
Fig. 3

APPARATUS AND METHOD FOR TESTING A GEOPHONE DURING ASSEMBLY

BACKGROUND OF THE INVENTION

This invention relates generally to an apparatus and method for testing geophones during assembly. More particularly, this invention concerns an apparatus and method for determining the position of a coil within a geophone and the resonant frequency of the geophone during assembly.

Geophones, used in seismic exploration, are low frequency electro-magnetic devices which sense motion by means of suspending an inertial mass structure from a rigid, fixed reference supporting structure. The mass is a coil suspended by springs about a magnet and associated pole pieces, one spring attached to each end of the coil. The effect of the springs is to position the coil within the magnetic field and to give the "suspension system" a predetermined resonant frequency. As a geophone senses motion, a voltage signal results from the relative motion of the coil to the magnetic field. The geophone's accuracy is dependent upon the coil position relative to the magnet and associated pole pieces. The coil must be centered to assure linear travel through the magnetic flux, cutting the lines of force at an even rate to minimize distortion of the voltage waveform generated. The geophone's effectiveness is further dependent upon its resonant frequency as oscillation at its natural resonant frequency will produce the greatest signal output by the geophone.

A generally recognized testing method for determining whether the spring combination places the coil in a centered position is the use of a shadowgraph. The shadowgraph includes a holding fixture, a light source which is directed across the bottom of the geophone coil assembly and through a magnifying lens, and a calibrated screen. The coil form is projected onto the screen, with the position of the shadow being indicative of the coil position. This is strictly an optical method. One of the inherent problems associated with this method is that it is not adaptable to assembly line testing because of its size. In addition, there is a significant problem with respect to the accuracy of this device due to the amplification of the image of the geophone required.

The inability to test for the resonant frequency of a geophone is a substantial limitation of the shadowgraph method. If it is found that the natural frequency or harmonic distortion of the geophone tested after assembly is not within acceptable limits, the geophone must be disassembled, the spring combination changed, and the geophone must be reassembled and tested. This results in both loss of time and material.

The problems enumerated in the foregoing are not intended to be exhaustive, but rather are among several which tend to impair the effectiveness of existing methods and devices for testing geophones. Recognizing the need for an improved method and apparatus for testing geophones, it is therefore a general object of the present invention to provide a means of determining rapidly and reliably the position of the coil at rest and the resonant frequency of the geophone during assembly.

SUMMARY OF THE INVENTION

In accordance with the present invention, an apparatus and method for testing geophones during assembly is provided. The apparatus includes a light source cooperating with a photocell to generate a voltage signal representative of the position of a geophone coil and resonant frequency of the coil.

The test geophone is positioned on a support member, located in a defined path between the light source and the photocell, in a manner interrupting the path of light from the light source to the photocell, such that light shines across the bottom of the geophone coil assembly. As the coil assembly is positioned higher or lower, the amount of light striking the photocell will vary accordingly resulting in a higher or lower voltage output. A calibration control is provided for setting a reference voltage to compare with the voltage of the tested geophone generated by the photocell.

Means for displaying the voltage signal, representative of the coil position, is also provided. In one embodiment, the display is a light emitting diode bar graph. The bar graph displays the deviation of the voltage signal from the reference, thus representing the displacement of the coil relative to a magnet and associated pole pieces found in the geophone.

In one alternate embodiment, the frequency of the coil is determined as the coil oscillates about the magnet and associated pole pieces. The support member for the geophone includes means adapted to support the magnet and associated pole pieces, thus allowing the coil to oscillate. An initial pulse is provided to the coil while located in the light path causing the photocell to generate an alternating voltage signal. This signal is delivered to a means for coupling the alternating current component of the signal, such as a coupling capacitor. A means for displaying the frequency of the oscillation represented by the alternating voltage signal is also provided, for example, a frequency counter.

The method for testing a geophone during assembly is comprised of several steps. Power and light are generated utilizing a power source and light source, respectively. Light is detected by a photocell and a voltage signal is generated in response to light received from the light source.

The geophone is positioned on a support member, located in a defined path between the light source and the photocell, in a manner interrupting light from the light source directed onto the photocell, such that light is directed across the bottom of a geophone coil assembly.

An initial pulse is provided to the coil. The voltage signals generated by the photocell when the coil is at rest and during oscillation are indicated, representing the displacement of the coil and resonant frequency of the coil, respectively.

There are, of course, additional aspects of the invention that will be described hereinafter and which will also form the subject of the claims appended hereto. The features of the present invention will become more apparent with reference to the following detailed description of a preferred embodiment in connection with the accompanying drawings, wherein like reference numerals have been applied to like elements.

BRIEF DESCRIPTION OF THE DRAWINGS

FIG. 1 depicts an apparatus for testing a geophone during assembly.

FIG. 2 illustrates an exploded view of a geophone.

FIG. 3 shows a geophone in relation to its support member of the test apparatus.

DETAILED DESCRIPTION OF THE DRAWINGS

Figure 6:
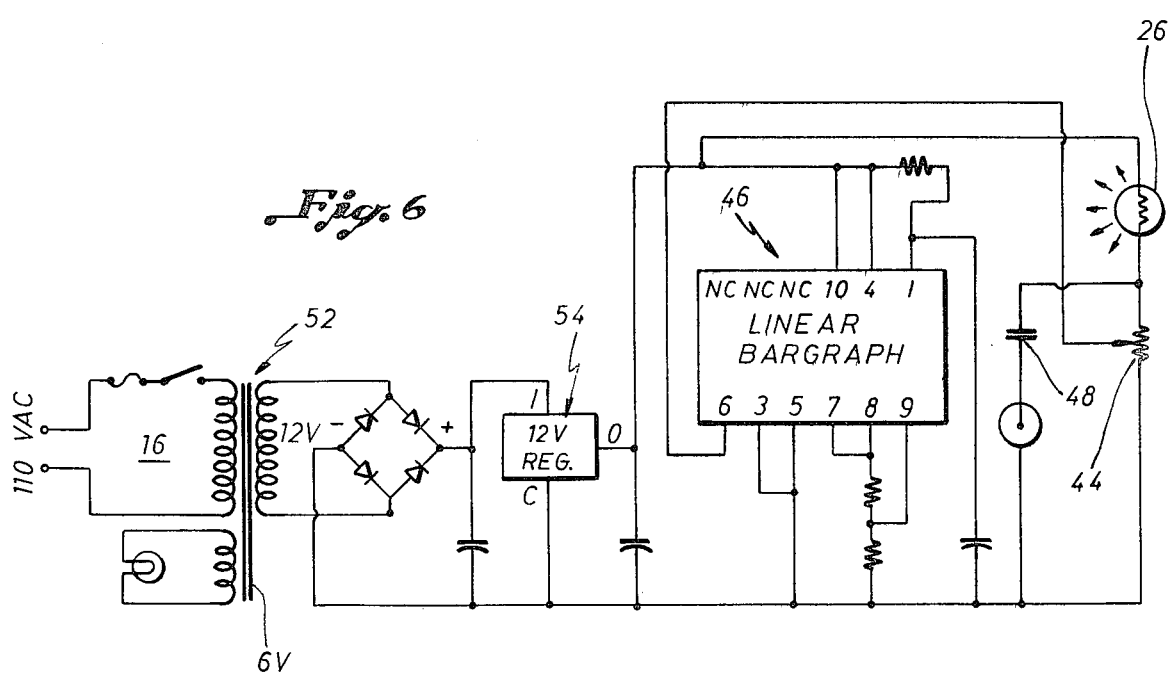
FIG. 6 illustrates a schematic diagram of the test apparatus depicted by FIG. 1.

Turning first to FIG. 1 there is shown an apparatus 10 including a cabinet 12. Located within the cabinet 12 is a power source 16 which operates conventionally. As illustrated by FIG. 6, the power source 16 includes a transformer 52 and a voltage regulator 54. The transformer 52 and voltage regulator 54 are designed to deliver 12 volts to a light emitting diode display 46 of the test apparatus 10.

Located on the top 18 of the cabinet 12 is a holder 20 for a light source 22. The light source 22, electrically connected to the power source 16, directs a narrow beam of light from its fixed position.

A holder 24 for a photocell 26 is located on the top 18 of the cabinet 12 directly across from the holder 20 for the light source 22. The photocell 26 operates by generating a voltage signal in proportion to the quantum of light striking it from the light source 22.

A member for support 28 of a geophone 32 is located between the light source 22 and the photocell 26. The geophone 32, which is shown in an exploded view in FIG. 2, includes a coil 36 suspended by springs 34 about a magnet 38 secured to pole pieces 40 at each end. The geophone is positioned on the support member 28 in a manner interrupting the light from the light source 22 directed onto the photocell such that the light source 22 directs light across the bottom of the geophone coil assembly 37.

The support member 28 further includes protrusions 29 adapted to permit the geophone coil assembly 37 to oscillate about the magnet 38 and associated pole pieces 40, as shown by FIG. 3. The protrusions 29 are located on the upper and lower portions of the support member 28. The protrusions 29 attach to the pole pieces 48 of the geophone 32, properly positioning it for testing and permitting the coil to vibrate freely.

Located within the cabinet 12 is a calibration control 44. The calibration control 44 is a potentiometer, and as shown by FIG. 6, is operatively associated with and electrically connected to the photocell 26. The calibration control 44 also includes a light emitting diode display 46 in the manner shown by FIG. 6. The light emitting diode display, located on the front panel 14 of the cabinet 12, is a bar graph in a preferred embodiment.

Figure 5A:
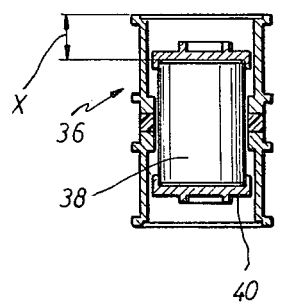
FIG. 5 illustrates a sectional view of a geophone with its coil assembly in a centered position as well as in a displaced position.
Figure 5B:
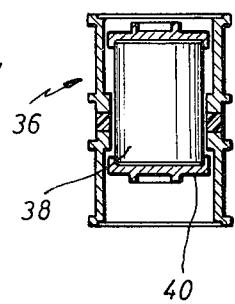
Figure 5C:
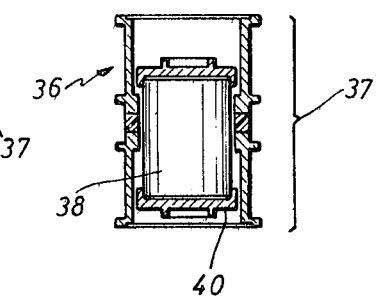

The calibration control 44 including the light emitting diode display 46 indicate the position of the geophone coil 36 relative to the magnet 38 and associated pole pieces 40. FIG. 5 illustrates a sectional view of the geophone coil 36 in a center position as well as displaced. As the coil 36 is positioned higher or lower relative to the magnet 38 and associated pole pieces 40, the amount of light striking the photocell 26 will vary accordingly, resulting in a higher or lower voltage signal output. The light emitting diode display 46 shows the deviation of the voltage signal from a reference voltage, representing the displacement of the coil 36.

Figure 4:
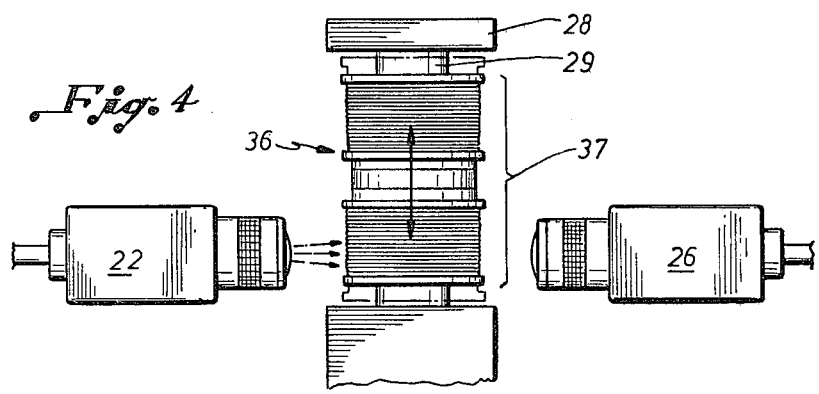
FIG. 4 depicts the light source and photocell components of the test apparatus in relation to an oscillating geophone coil assembly.

The test apparatus 10 further includes a frequency counter 50, such as Hewlett-Packard Model No. 5300D, for indicating the resonant frequency of the geophone coil 36 as it oscillates about the magnet 38 and associated pole pieces 40. As illustrated by FIG. 4, oscillation of the geophone coil 36 causes light directed from the light source 22 onto the photocell 26 to be interrupted periodically. The alternating voltage signal generated by the photocell 26, representative of the resonant frequency of oscillation, is measured by the frequency counter 50.

The frequency counter 50 is operatively associated with and electrically connected to the power source 16 and a coupling capacitor 48, as illustrated by FIG. 6. The coupling capacitor 48 is located within the cabinet 12 of the test apparatus 10. The coupling capacitor couples the alternating current voltage component and delivers it from the photocell 22 to the frequency counter 50.

The foregoing description of the invention has been directed to a particular preferred embodiment in accordance with the statutory requirements and for purposes of explanation and illustration. It will be apparent, however, to those skilled in this art that modifications and changes in both the apparatus and method may be made without departing from the scope and spirit of the invention. Accordingly, it is intended that all such alternatives, modifications, and variations which fall within the spirit and scope of the invention as defined in the appended claims be embraced thereby.

What is claimed is:

1. Apparatus for testing a geophone during assembly comprising:

a power source;

a light source electrically connected to said power source;

means, electrically connected to said power source, for generating a voltage signal in response to light received from said light source;

a member for supporting said geophone, said geophone including a coil suspended by springs about a cylindrical magnet and pole pieces secured at each end of the magnet, said member located in a defined path between said light source and said means for generating a voltage signal; and means for indicating said voltage signal, electrically connected to and operatively associated with said power source and said means for generating a voltage signal, said voltage signal representative of the resilient characteristics of said geophone springs.

2. Apparatus for testing a geophone during assembly comprising:

a power source;

a light source electrically connected to said power source;

means, electrically connected to said power source, for generating a voltage signal in response to light received from said light source;

a member for supporting said geophone, said geophone including a coil suspended by springs about a cylindrical magnet and pole pieces secured at each end of the magnet, said member located in a defined path between said light source and said means for generating a voltage signal, said geophone positioned on said member in a manner interrupting the light directed from said light source onto said means for generating a voltage signal; and, means for indicating said voltage signal, electrically connected to and operatively associated with said power source and means for generating a voltage, with said voltage signal representative of the resilient characteristics of said geophone springs, characterizing the position of said coil relative to said magnet and pole pieces.

3. Apparatus for testing a geophone during assembly comprising:
a power source;
a light source electrically connected to said power source;
means, electrically connected to said power source, for generating a voltage signal in response to light received from said light source;
a member for supporting said geophone, said geophone including a coil suspended by springs about a cylindrical magnet and pole pieces secured at each end of the magnet, said member located in a defined path between said light source and said means for generating a voltage signal, said geophone positioned on said member in a manner interrupting the light directed from said light source onto said means for generating a voltage, said member including a means adapted to permit said coil to oscillate about said magnet and pole pieces; and
means for indicating said voltage signal, electrically connected to and operatively associated with said power source and said means for generating a voltage, said voltage signal representative of the resilient characteristics of said geophone springs, characterizing the resonant frequency of said coil oscillating about said magnet and pole pieces.

4. An apparatus for testing a geophone as set forth in any of claims 1, 2 or 3 wherein said means for generating a voltage signal comprises a photocell.

5. An apparatus for testing geophones as set forth in claim 1 wherein said geophone is positioned on said member for supporting said geophone in a manner interrupting the light directed from said light source onto said means for generating a voltage signal.

6. An apparatus for testing a geophone as set forth in either claim 1 or 2 wherein said member for supporting said geophone further includes a means adapted to permit said coil to oscillate about said magnet and pole pieces.

7. An apparatus for testing a geophone as set forth in claim 1 wherein said means for indicating said voltage signal includes:
means for indicating said voltage signal representative of the position of said coil relative to said magnet and pole pieces; and
means for indicating said voltage signal representative of the resonant frequency of said coil oscillating about said magnet and pole pieces.

8. An apparatus for testing a geophone as set forth in claim 1 wherein said means for indicating said voltage signal comprises:
a calibration control adapted to receive said voltage signal from said means for generating a voltage, including a light emitting diode display for display of the deviation of said voltage signal from a reference voltage, said voltage signal representing the displacement of the coil relative to the magnet and pole pieces;
a means for coupling an alternating current component of said voltage signal; and
a means for measuring the frequency of oscillation of said coil, operatively associated with and electrically connected to said means for coupling, wherein said voltage signal delivered to said means for measuring represents the resonant frequency of said coil oscillating about said pole pieces.

9. An apparatus for testing a geophone as set forth in claim 2 wherein said means for indicating said voltage signal comprises:
a calibration control adapted to receive said voltage signal from said means for generating a voltage, including a light emitting diode display for display of the deviation of said voltage signal from a reference voltage.

10. An apparatus for testing a geophone as set forth in claim 3, wherein said means for indicating a voltage signal comprises:
a means for coupling an alternating current component of said voltage signal; and
a means for measuring the frequency of oscillation of said coil, electrically connected to and operatively associated with said means for coupling, wherein said voltage signal delivered to said means for measuring represents the resonant frequency of said coil oscillating about said magnet and pole pieces.

11. An apparatus for testing a geophone as set forth in claim 2 wherein said apparatus further includes a means for indicating said voltage signal, electrically connected to and operatively associated with said power sources and said means for generating a voltage in response to light, said voltage signal representative of the resilient characteristics of said geophone springs, characterizing the resonant frequency of said coil oscillating about said magnet and pole pieces.

12. Apparatus for testing a geophone during assembly comprising:
a power source;
a light source electrically connected to said power source;
a photocell, electrically connected to said power source, generating a voltage signal in response to light received from said light source in proportion to the quantum of light striking it;
a member for supporting said geophone, said geophone including a coil suspended by springs about a cylindrical magnet and pole pieces secured at each end of the magnet said member located in a defined path between said light source and said photocell, said geophone positioned on said member in a manner interrupting light directed from said light source onto said photocell such that said light source directs light across a lower end of said geophone; and,
means for displaying said voltage signal, electrically connected to and operatively associated with said power source and said photocell, said voltage signal representative of the resilient characteristics of said geophone springs including the displacement of said coil relative to said magnet and pole pieces and the resonant frequency of said coil oscillating about said magnet and pole pieces.

13. Apparatus for testing a geophone during assembly comprising:
a power source;
a light source electrically connected to said power source;
a photocell, electrically connected to said power source, generating a voltage signal in response to light received from said light source in proportion to the quantum of light striking it;

a member for supporting said geophone, said geophone including a coil suspended by springs about a cylindrical magnet and pole pieces secured at each end of the magnet, said member located in a defined path between said light source and said photocell, said geophone positioned on said member in a manner interrupting light directed from said light source onto said photocell such that said light source directs light across a lower end of said geophone; and, a calibration control adapted to receive said voltage signal from said photocell, electrically connected to and operatively associated with said power source and said photocell, including a light emitting diode display for display of the deviation of said voltage signal from a reference voltage, said voltage signal representing the displacement of said coil relative to said magnet and pole pieces.

14. An apparatus as set forth in either of claims 12 or 13 wherein said member for supporting said geophone further includes a means adapted to permit said coil to oscillate about said magnet and pole pieces.

15. An apparatus as set forth in claim 12 wherein said means for displaying said voltage signal comprises:

a calibration control adapted to receive said voltage signal from said photocell, including a light emitting diode display for display of the deviation of said voltage signal from a reference voltage;

means for coupling an alternating current component of said voltage signal; and means for measuring the frequency of oscillation of said coil, electrically connected to and operatively associated with said means for coupling wherein said voltage signal delivered to said means for measuring represents the resonant frequency of said coil oscillating about said magnet and pole pieces.

16. An apparatus for testing a geophone as set forth in claim 13 wherein said calibration control comprises a potentiometer including a light emitting diode display.

17. An apparatus for testing geophone as set forth in claim 13 wherein said apparatus further includes:

means for coupling an alternating current component of said voltage signal, electrically connected to and operatively associated with said photocell; and means for measuring the frequency of oscillation of said coil, electrically connected to and operatively associated with said power source and said means for coupling, wherein said voltage signal delivered to said means for measuring represents the resonant frequency of said coil oscillating about said magnet and pole pieces.

18. Apparatus for testing a geophone during assembly comprising:

a power source;

a light source electrically connected to said power source;

a photocell, electrically connected to said power source, generating a voltage signal in response to light received from said light source in proportion to the quantum of light striking it;

a member for supporting said geophone, said geophone including a coil suspended by springs about a cylindrical magnet and pole pieces secured at each end of the magnet, said member located in a defined path betwen said light source and said photocell, said geophone positioned in a manner interrupting the light directed onto said photocell such that said light source directs light across a lower end of said geophone, said member including a means adapted to permit said coil to oscillate about said magnet and pole pieces; and means for coupling an alternating current component of said voltage signal, electrically connected to and operatively associated with said photocell; and, means for measuring the frequency of oscillation of said coil, electrically connected to and operatively associated with said power source and said means for coupling, wherein said voltage signal delivered to said means for measuring represents the resonant frequency of said coil oscillating about said magnet and pole pieces.

19. An apparatus for testing a geophone as set forth in claim 18 wherein said means for coupling an alternating current component of said voltage signal comprises a coupling capacitor.

20. An apparatus for testing a geophone as set forth in claim 18 wherein said means for measuring the frequency of oscillation of said coil comprises a frequency counter.

21. An apparatus for testing a geophone during assembly comprising:

a power source;

a light source electrically connected to said power source;

a photocell, electrically connected to said power source, generating a voltage signal in response to light received from said light source in proportion to the quantum of light striking it;

a member for supporting said geophone, said geophone including a coil suspended by springs about a cylindrical magnet and pole pieces secured at each end, said member located in a defined path between said light source and said photocell, said geophone positioned on said member in a manner interrupting the light directed onto said photocell such that said light source directs light across a lower end of said geophone, said member including a means adapted to permit said coil to oscillate about said pole pieces;

a calibration control adapted to receive said voltage signal from said photocell, electrically connected to and operatively associated with said power source and said photocell, including a light emitting diode display for display of the deviation of said voltage signal from a reference voltage, said voltage signal representing the displacement of said coil relative to said magnet and pole pieces;

a coupling capacitor, electrically connected to and operatively associated with said photocell; and a frequency counter, electrically connected to and operatively associated with said power source and said coupling capacitor, wherein said voltage signal delivered to said frequency counter represents the resonant frequency of said coil oscillating about said magnet and pole pieces.

22. Apparatus for testing a geophone as set forth in claim 21 wherein said calibration control comprises a potentiometer including a light emitting diode display.

23. A method for testing a geophone during assembly comprising the steps of:

generating power utilizing a power source;

generating light from a light source;

detecting light with a photocell, said light received from said light source, and generating a voltage signal in response to said light detected;

positioning said geophone, having a coil suspended by springs about a cylindrical magnet and pole pieces secured at each end of the magnet, on a support member in a manner interrupting the light from the light source directed onto the photocell such that light is directed across a lower end of said geophone;

oscillating the coil by an initial pulse; and indicating said voltage signal generated by said photocell, said voltage signal representative of the resilient characteristics of said geophone springs.

24. A method for testing a geophone as set forth in claim 23 wherein said step for indicating said voltage signal generated includes indicating said voltage signal characterizing the displacement of said coil relative to said magnet and pole pieces.

25. A method for testing a geophone as set forth in claim 23 wherein said step for indicating said voltage signal generated includes indicating said voltage signal characterizing the resonant frequency of said coil oscillating about said magnet and pole pieces.

* * * * *